(12) United States Patent  
Ota (10) Patent No.: US 9,158,984 B2
(45) Date of Patent: Oct. 13, 2015

(54) COMPUTER-READABLE RECORDING MEDIUM RECORDING PROGRAM FOR IMAGE PROCESSING, INFORMATION PROCESSING APPARATUS, INFORMATION PROCESSING SYSTEM, AND IMAGE PROCESSING METHOD

(71) Applicant: NINTENDO CO., LTD., Kyoto (JP)

(72) Inventor: Tatsuro Ota, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 42 days.

(21) Appl. No.: 14/105,426

(22) Filed: Dec. 13, 2013

(65) Prior Publication Data

US 2014/0286574 A1   Sep. 25, 2014

(30) Foreign Application Priority Data

Mar. 22, 2013   (JP) .................. 2013-060612

(51) Int. Cl.
*G06K 9/46* (2006.01)
*G06K 9/32* (2006.01)
*H04N 1/40* (2006.01)

(52) U.S. Cl.
CPC .................... *G06K 9/3208* (2013.01)

(58) Field of Classification Search
CPC ....................................................... G06K 9/00
USPC .......................... 382/125, 190, 198; 358/448
See application file for complete search history.

(56) References Cited

U.S. PATENT DOCUMENTS 5,825,924 A * 10/1998 Kobayashi .................... 382/219
5,970,170 A * 10/1999 Kadashevich et al. ........ 382/187

FOREIGN PATENT DOCUMENTS

JP       2000-322602        11/2000

* cited by examiner

*Primary Examiner* — Abolfazl Tabatabai
(74) *Attorney, Agent, or Firm* — Nixon & Vanderhye P.C.

(57) ABSTRACT

A computer is caused to execute: acquisition of a captured image captured by an imaging device; display of an image including the captured image on a display device; and detection from the captured image, of a feature in a real space captured in the captured image, using an image for detection of the feature. In a case where the captured image acquired in the acquisition of the image captured is a reversed image, the feature is detected by performing a reverse comparison process involving: comparing the captured image with a reversed image of the image for detection; or comparing an image obtained by further reversing the captured image, with the image for detection.

19 Claims, 5 Drawing Sheets

COMPUTER-READABLE RECORDING MEDIUM RECORDING PROGRAM FOR IMAGE PROCESSING, INFORMATION PROCESSING APPARATUS, INFORMATION PROCESSING SYSTEM, AND IMAGE PROCESSING METHOD

This application is based upon and claims the benefit of priority of the prior Japanese Patent Application No. JP2013-060612, filed on Mar. 22, 2013, the entire contents of which are incorporated herein by reference.

FIELD

The present disclosure relates to a computer-readable recording medium recording a program for image processing, an information processing apparatus, an information processing system, and an image processing method.

BACKGROUND AND SUMMARY

Up to now, there have been image processing techniques for recognizing a pattern in a captured image. For example, there have been image processing apparatuses for recognizing a pattern of a two-dimensional bar code.

Further, in the case where the display direction of a display device on which a captured image is displayed is the same as the image capturing direction of a camera (the eye direction of a user is opposite to the image capturing direction of the camera), it is common practice to left-right reverse the captured image and display the reversed captured image on the display device.

If such a reversed captured image is used, it is unfortunately difficult to compare the captured image with an image for detection to detect a feature in the captured image.

The present disclosure provides a computer-readable recording medium that records therein a program for image processing causing a computer to function as: a captured image acquiring unit that acquires an image captured by an imaging device; a display controlling unit that displays an image including the captured image on a display device; and a feature detecting unit that detects, from the captured image, a feature in a real space captured in the captured image, using an image for detection of the feature. In a case where the captured image acquired by the captured image acquiring unit is a reversed image, the feature detecting unit performs a reverse comparison process to thereby detect the feature, the reverse comparison process involving: comparing the captured image with a reversed image of the image for detection; or comparing an image obtained by further reversing the captured image, with the image for detection.

Here, the display device may be connected as peripheral equipment to the computer that executes the program according to the present disclosure, and may be connected thereto via a communication network or the like. Further, the computer that fulfils a main role in executing the program according to the present disclosure may be constructed in a virtual environment such as so-called cloud computing.

Further, the feature in the real space refers to a marker for a so-called augmented reality (AR) process or a code such as a two-dimensional bar code, for example. Then, such a feature may be put onto a component such as a card, for example. Further, such a feature is not limitatively used for the AR process, and is not limited to a dedicated marker, a dedicated code, and the like. Even articles used for other purposes can be used as the feature as long as the display reference of the virtual object can be acquired therefrom.

Further, in a case where an image capturing direction of the imaging device is substantially the same as a display direction of the display device, the feature detecting unit may determine that the captured image is a reversed image, and may perform the reverse comparison process to thereby detect the feature. In a case where the imaging device used for the acquisition of the captured image is an imaging device set on a display surface side of the display device, the feature detecting unit may determine that the captured image is a reversed image, and may perform the reverse comparison process to thereby detect the feature.

This is because the captured image can be determined to be reversed, in a case where the imaging device and the display device have such relations as described above.

Further, in a case where the image capturing direction of the imaging device is substantially opposite to the display direction of the display device, the feature detecting unit may determine that the captured image is not a reversed image, and may compare the captured image with the image for detection to thereby detect the feature. In a case where the imaging device used for the acquisition of the captured image is an imaging device set on an opposite side to a display surface of the display device, the feature detecting unit may determine that the captured image is not a reversed image, and may compare the captured image with the image for detection to thereby detect the feature.

This is because the captured image can be determined not to be reversed, in a case where the imaging device and the display device have such relations as described above.

Further, the program for image processing may further cause the computer to function as: a holding unit that holds the image for detection; and a reversed image-for-detection generating unit that reverses the image for detection held by the holding unit, to thereby generate the reversed image of the image for detection.

Further, the program for image processing may further cause the computer to function as: a reference information acquiring unit that acquires display reference information used as a reference of at least any of a position and a posture in a virtual space, of a virtual object placed in the virtual space, based on the feature; and an image generating unit that generates an image of the virtual space including the virtual object placed in accordance with the display reference information. The display controlling unit may display, on the display device, a composite image in which the image of the virtual space is superimposed on the captured image.

The display reference information is, for example, a reference indicating at least any of a position and a posture in a captured space. The display reference information may be, for example, a coordinate system the origin and three axes of which are determined in accordance with the position and posture of a marker, or may be, for example, position posture information of a marker with respect to the imaging device.

Note that types of augmented reality technique to which the present disclosure is applied are not limited. The present disclosure can be applied to, for example, a type of augmented reality technique of displaying a composite image in which a virtual space image is combined with a captured image, to thereby enable a user to view the image of the virtual space superimposed on the real space. The present disclosure can also be applied to, for example, a type of augmented reality technique (such as head-up display (HUD)) of projecting a virtual space image in the field of view of a user, to thereby enable the user to view the image of the virtual space superimposed on the real space.

Further, in the case where the captured image acquired by the captured image acquiring unit is a reversed image, the image generating unit may generate an image of the virtual space including a reversed image of the virtual object In this way, the directions of the captured image and the image of the virtual space in the displayed image can be made coincident with each other, and a feeling of strangeness given to the user can be reduced.

Further, the captured image acquiring unit may acquire an image reversed by the imaging device, to thereby acquire a reversed image of the captured image, and the captured image acquiring unit may acquire the captured image that is outputted from the imaging device and is then subjected to a reverse process by software processing, to thereby acquire a reversed image of the captured image.

Further, the present disclosure can be interpreted as an information processing apparatus, an information processing system including one or more information processing apparatuses, a method to be executed by a computer, or a program causing a computer to execute. Further, the present disclosure can also be interpreted as a recording medium that records therein such a program, the recording medium being readable by computers, other apparatuses or machines, and the like. Here, the recording medium readable by the computers and the like refers to a recording medium that can accumulate therein information such as data and a program through an electrical, magnetic, optical, mechanical, or chemical action, and allows the computers and the like to read such information out thereof.

DETAILED DESCRIPTION OF NON-LIMITING EXAMPLE EMBODIMENTS

Hereinafter, an embodiment of the present disclosure is described with reference to the drawings. Note that the embodiment described below is given as a mere example for carrying out the present disclosure, and the present disclosure is not limited to a specific configuration described below.

At the time of carrying out the present disclosure, a specific configuration may be adopted as appropriate for each embodiment. For example, the present disclosure can be applied to: an information processing program executed by a computer of a portable information processing apparatus; an information processing apparatus; an information processing system including one or more information processing apparatuses; an information processing method; and the like.

The present disclosure has an object to improve the detection accuracy of a feature in a captured image even in the case where the captured image is reversed.

<Configuration of System>

Figure 1:
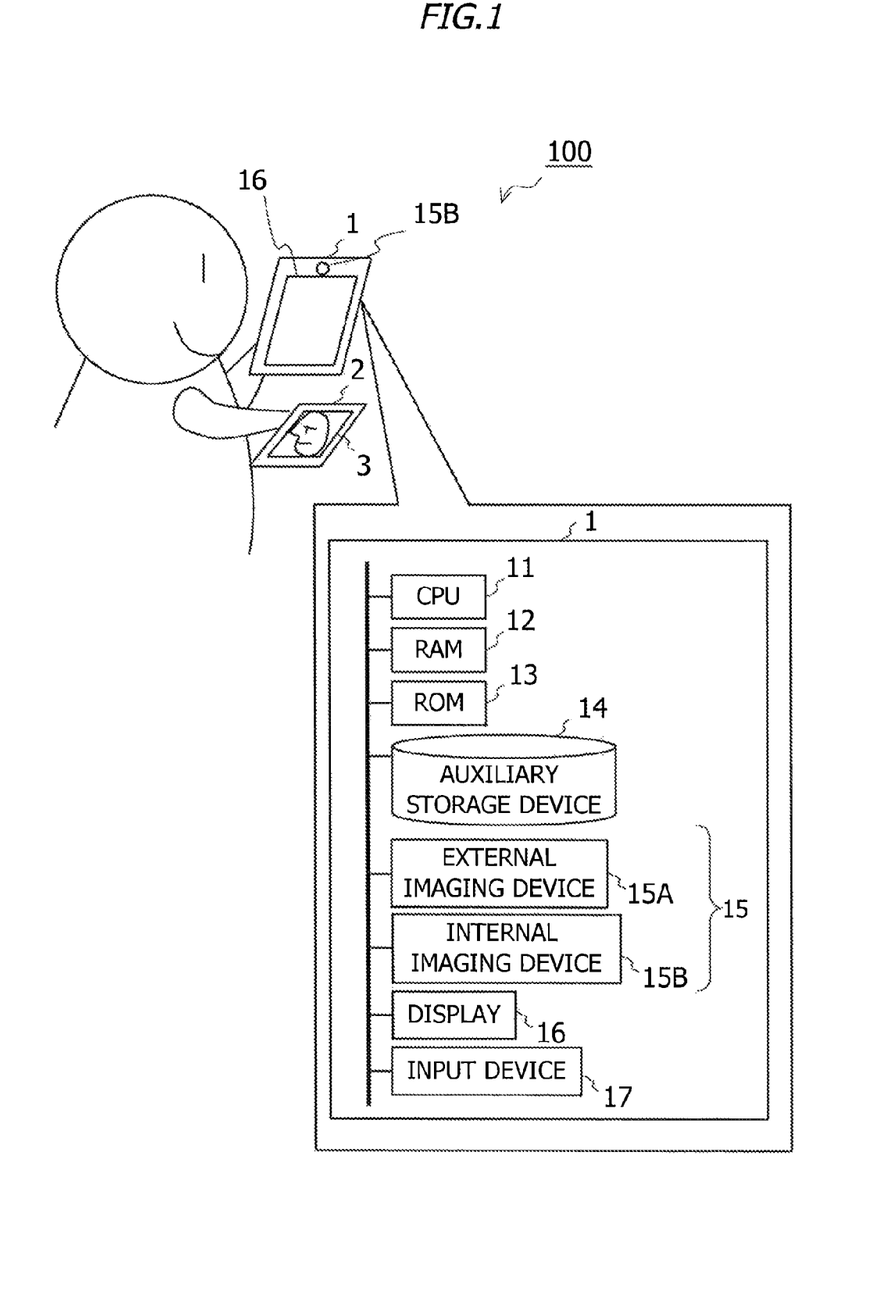
FIG. 1 shows an example non-limiting system including an information processing apparatus according to an embodiment.

FIG. 1 is a diagram illustrating a configuration of a system 100 according to the present embodiment. The system 100 includes an information processing apparatus 1 and a card 2.

The information processing apparatus 1 is an information processing apparatus in which a CPU (Central Processing Unit) 11, a RAM (Random Access Memory) 12, a ROM (Read Only Memory) 13, an auxiliary storage device 14, an imaging device 15, a display 16, and an input device 17 such as various buttons and a touch panel are electrically connected to one another. Note that, with regard to a specific hardware configuration of the information processing apparatus 1, components may be omitted, replaced, and added as appropriate for each embodiment.

The information processing apparatus 1 according to the present embodiment includes two imaging devices 15. Hence, in the case where these imaging devices are not distinguished, both the imaging devices are simply referred to as "imaging device 15". In the case where these imaging devices are distinguished, the imaging device that is provided so as to be capable of taking an image on the opposite side to a display surface of the display 16 viewed by a user is referred to as an external imaging device 15A, and the imaging device that is provided so as to be capable of taking an image on the side of the user who views the display 16 is referred to as an internal imaging device 15B.

The CPU 11 is a central processing unit, and processes commands and data developed in the RAM 12, the ROM 13, and the like, to thereby control components included in the information processing apparatus 1, such as the RAM 12 and the auxiliary storage device 14. Further, the RAM 12 is a main storage device, and is controlled by the CPU 11. Various commands and various pieces of data are written into and read out of the RAM 12. That is, the CPU 11, the RAM 12, and the ROM 13 constitute a control unit of the information processing apparatus 1.

The auxiliary storage device 14 is a non-volatile storage device. Information that is desired to be held even if the information processing apparatus 1 is powered down, and the like are mainly written into and read out of the auxiliary storage device 14. Examples of the information desired to be held include: an OS (Operating System) of the information processing apparatus 1 loaded onto the RAM 12; various programs for executing processing to be described later; and various pieces of data used by the information processing apparatus 1. Examples of the auxiliary storage device 14 include an EEPROM (Electrically Erasable Programmable ROM), a HDD (Hard Disk Drive), and the like. Examples of the auxiliary storage device 14 may further include a portable medium that is detachably attached to the information processing apparatus 1. Examples of the portable medium include a memory card made of an EEPROM and the like, a CD (Compact Disc), a DVD (Digital Versatile Disc), a BD (Blu-ray Disc), and the like. An auxiliary storage device 14 made of the portable medium and a non-portable auxiliary storage device 14 can be used in combination.

A marker 3 is put onto the card 2 through a method such as printing. The marker 3 is associated with a virtual object that is displayed on the display 16 by the information processing apparatus 1, and serves as an index indicating a reference of the position posture when the virtual object associated with the marker 3 is displayed. Further, the virtual object has up-down, front-back, and left-right directions. Hence, it is preferable that the marker 3 enable specification of the display posture of the virtual object. That is, it is preferable that the marker 3 be symbols, characters, figures, pictures, combinations thereof, and the like that enable specification of the position and posture with respect to the imaging device 15 when being captured by the imaging device 15. The number of the cards 2 illustrated in FIG. 1 is one, but the number of the used cards 2 may be more than one. Further, in the case where the number of the used cards 2 is more than one, the markers 3 that are different from each other for displaying different virtual objects may be respectively put onto the cards 2, and the plurality of cards 2 onto which the same marker is put may be used.

Next, functions of the information processing apparatus 1 according to the present embodiment are described. The information processing apparatus 1 according to the present embodiment is an information processing apparatus having a so-called AR function. The information processing apparatus 1 has a function of: composing a virtual object in a virtual space rendered by a virtual camera with a captured image of a real space captured by the imaging device 15; and displaying the composite image on the display 16. In the present embodiment, the virtual object is three-dimensional image data, but may be two-dimensional image data.

Figure 2:
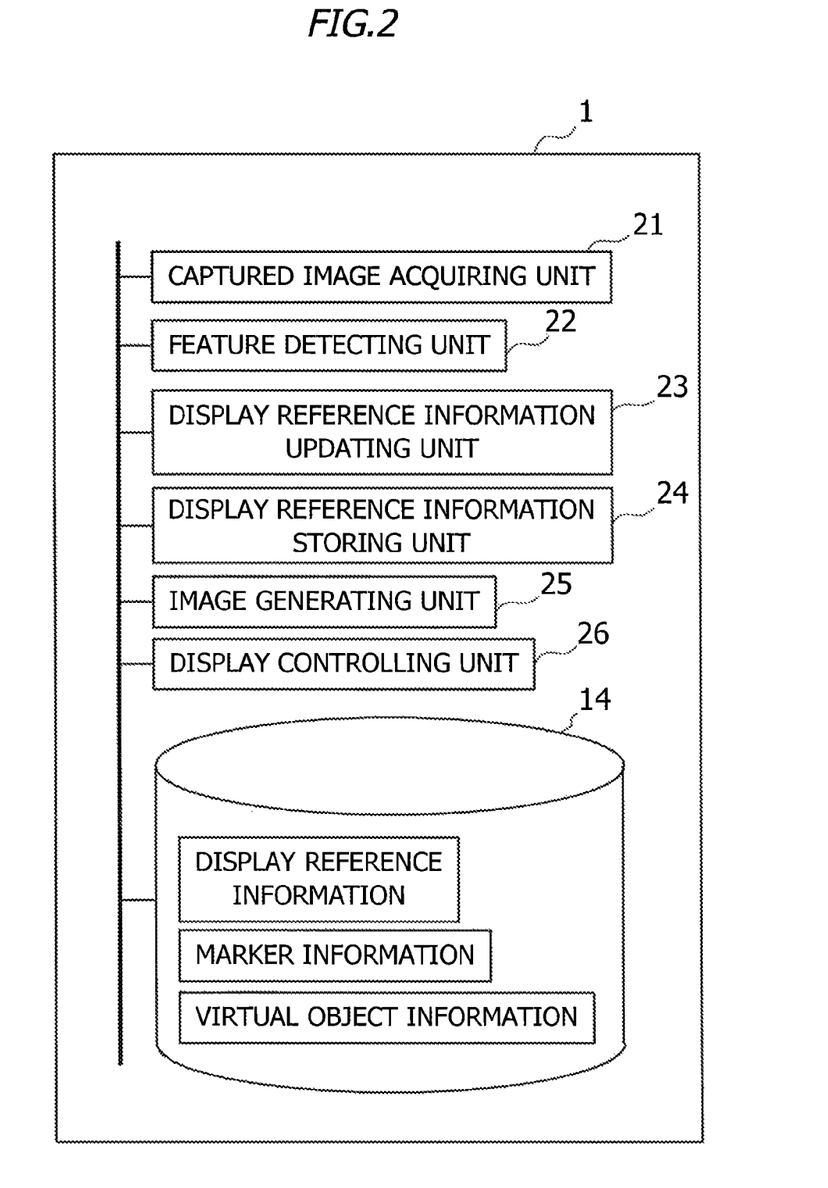
FIG. 2 shows an example non-limiting functional configuration of an information processing apparatus according to an embodiment.

FIG. 2 is a diagram schematically illustrating a functional configuration of the information processing apparatus 1 according to the present embodiment. When the CPU 11 interprets and executes various programs developed in the RAM 12, the information processing apparatus 1 according to the present embodiment functions as an information processing apparatus including a captured image acquiring unit 21, a feature detecting unit 22, a display reference information updating unit 23, a display reference information storing unit 24, an image generating unit 25, and a display controlling unit 26. In the present embodiment, description is given of an example in which these functions are all executed by the general-purpose CPU 11, but the entirety or a part of these functions may be implemented by one or more dedicated processors.

The captured image acquiring unit 21 acquires a captured image captured by the imaging device 15. Note that, in the present embodiment, the external imaging device 15A outputs the captured image as it is without reversing the captured image, whereas the internal imaging device 15B outputs the left-right reversed captured image. The reason for this is as follows: the internal imaging device 15B used for the acquisition of the captured image is set on the same plane as the display surface of the display 16 (that is, the image capturing direction of the internal imaging device 15B is substantially the same as the display direction of the display 16); and in the case where the captured image captured by the internal imaging device 15B is displayed on the display 16, if the captured image is outputted without being left-right reversed, the user who expects display similar to that of a mirror has a feeling of strangeness. Note that the left-right reverse process of the captured image may not be performed by the internal imaging device 15B. In the case where the imaging device used for the imaging is the internal imaging device 15B that outputs the captured image as it is (without reversing the captured image), the captured image is reversed through a method of causing the CPU 11 included in the information processing apparatus 1 to execute a program for reverse (a method using software processing), a method of reversing the captured image by means of another processor, and the like, before the captured image is acquired by the captured image acquiring unit 21. In any case, the captured image acquiring unit 21 according to the present embodiment acquires the unreversed captured image in the case where the imaging device used for the imaging is the external imaging device 15A, and acquires the reversed captured image in the case where the imaging device used for the imaging is the internal imaging device 15B.

The feature detecting unit 22 performs, on the image captured by the imaging device 15, image processing such as pattern matching using, for example, an image for detection (a marker image or a reversed marker image), and thus can detect the marker 3 that is a feature in the real space included in this image. The marker 3 is detected using, for example, an image recognition engine.

Here, in the case where the captured image acquired by the captured image acquiring unit 21 is a reversed image, the feature detecting unit 22 performs a reverse comparison process of comparing the captured image with the reversed marker image, to thereby detect the marker 3 included in the captured image. That is, in the present embodiment, in the case where the image capturing direction of the imaging device 15 used for the acquisition of the captured image is substantially the same as the display direction of the display 16 or where the imaging device 15 used for the acquisition of the captured image is the imaging device 15B that is set on the same plane as the display surface of the display 16, the feature detecting unit 22 performs the reverse comparison process. Meanwhile, in the present embodiment, in the case where the image capturing direction of the imaging device 15 is substantially opposite to the display direction of the display 16 or where the imaging device 15 used for the acquisition of the captured image is the imaging device 15A that is set on the opposite plane to the display surface of the display 16, the feature detecting unit 22 does not perform the reverse comparison process, and compares the captured image with the image for detection as normal procedures, to thereby detect the marker 3.

The display reference information storing unit 24 stores therein display reference information for determining the position and posture of the virtual object placed in the virtual space. In the present embodiment, the display reference information is a reference used for indicating the position and posture of the virtual object in the virtual space. Note that the display reference information may be a reference used for indicating any one of the position and posture of the virtual object in the virtual space. In a reference acquisition process of the present embodiment, a marker coordinate system is acquired for each marker 3, as the display reference information. The origin of the marker coordinate system is the central point of the marker 3, and three axes orthogonal to one another are used for the marker coordinate system. Note that others than the marker coordinate system, such as the captured image itself, may be used as the display reference information. Further, one marker coordinate system can be shared by a plurality of the markers 3. A coordinate system in the virtual space is defined with reference to the marker 3 placed in the real space, whereby the real space and the virtual space can be made to correspond to each other. Note that another method than the method using the marker coordinate system may be adopted to make the real space and the virtual space correspond to each other.

The display reference information updating unit 23 acquires information serving as a reference indicating the position and posture in the space captured in the captured image, based on the detected marker 3, and updates the display reference information. In the present embodiment, even in the case where the camera or the marker 3 is moved, the display reference information stored by the display reference information storing unit 24 is updated in accordance with the latest marker position and posture with respect to the camera.

In the present embodiment, the virtual object placed in the virtual space is placed in the marker coordinate system of the marker 3 to which this virtual object is made to correspond. The marker coordinate system can be acquired by calculating the position and posture of the marker 3 with respect to the imaging device 15, from how the marker 3 included in the captured image looks. The position and posture of the virtual camera in the marker coordinate system is coincident with the position and posture of the imaging device 15 in the real space. Hence, if the virtual space is defined on the basis of the marker 3 and the position or image capturing direction of the imaging device 15 is changed in this virtual space, an image of the virtual space displayed on the display 16 is also changed.

The image generating unit 25 places, in the virtual space, the virtual object the position and posture of which are determined in accordance with the display reference information stored by the display reference information storing unit 24, and generates an image of the virtual space observed from the virtual camera, to thereby render a virtual space image. Then, the information processing apparatus 1 according to the present embodiment, which has the AR function as described above, generates a composite image in which the virtual space image including the virtual object generated by the image generating unit 25 is superimposed on the captured image acquired by the captured image acquiring unit 21.

The display controlling unit 26 displays the generated composite image including the captured image, on the display 16 as a display device. In this way, the user can feel as if the virtual object actually existed in the real space.

Next, information held by the information processing apparatus 1 according to the present embodiment is described. The information processing apparatus 1 holds marker information and virtual object information in addition to the above-mentioned display reference information stored by the display reference information storing unit 24.

The marker information is information regarding the marker 3. The marker information contains, for example, a marker ID for discriminating the marker 3, a marker image, a reversed marker image, a marker size, a corresponding virtual object ID, the position posture of the virtual object, the display size of the virtual object, and the like.

Figure 3:
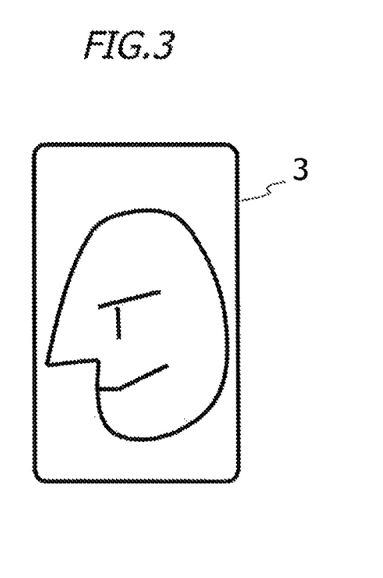
FIG. 3 shows an example non-limiting marker image used in embodiment.
Figure 4:
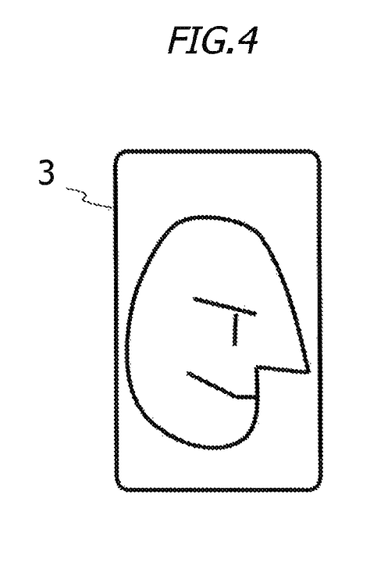
FIG. 4 shows an example non-limiting reversed marker image used in an embodiment.

FIG. 3 is a diagram illustrating an example of the marker image used in the present embodiment, and FIG. 4 is a diagram illustrating an example of the reversed marker image used in the present embodiment. The marker image is an image indicating an external appearance of the marker 3, and the reversed marker image is an image obtained by left-right reversing its corresponding marker image. Further, the marker size is information indicating the size of the marker 3, such as the height and width of the marker 3. On the basis of the marker image or the reversed marker image and the marker size, the display reference information updating unit 23 of the information processing apparatus 1 can acquire the distance between the imaging device 15 and the marker 3, the posture of the marker 3, and the like, that is, position posture information of the marker 3 and the marker coordinate system thereof, from how the marker 3 included in the captured image looks. The corresponding virtual object ID is a discrimination number of the virtual object displayed at a position corresponding to the marker 3. Note that two or more virtual objects may be associated with one marker 3. In the present embodiment, the marker information contains the virtual object ID of the virtual object managed by the corresponding marker coordinate system. The position posture of the virtual object is indicated by the position (coordinate value) and the posture (vector) in the marker coordinate system. The display size of the virtual object is information indicting the size of the virtual object placed in the marker coordinate system. The marker information exists for each marker 3 used in the system 100.

The virtual object information is information regarding the virtual object displayed at a position corresponding to the marker 3. The virtual object information contains, for example, a virtual object ID for discriminating the virtual object and data on the virtual object. The virtual object information exists for each virtual object used in the system 100.

<Flow of Processing>

Next, a flow of processing executed in the present embodiment is described. Note that specific processing contents and processing order illustrated in a flow chart according to the present embodiment are given as a mere example for carrying out the present disclosure. Specific processing contents and processing order may be selected as appropriate for each embodiment of the present disclosure.

Figure 5:
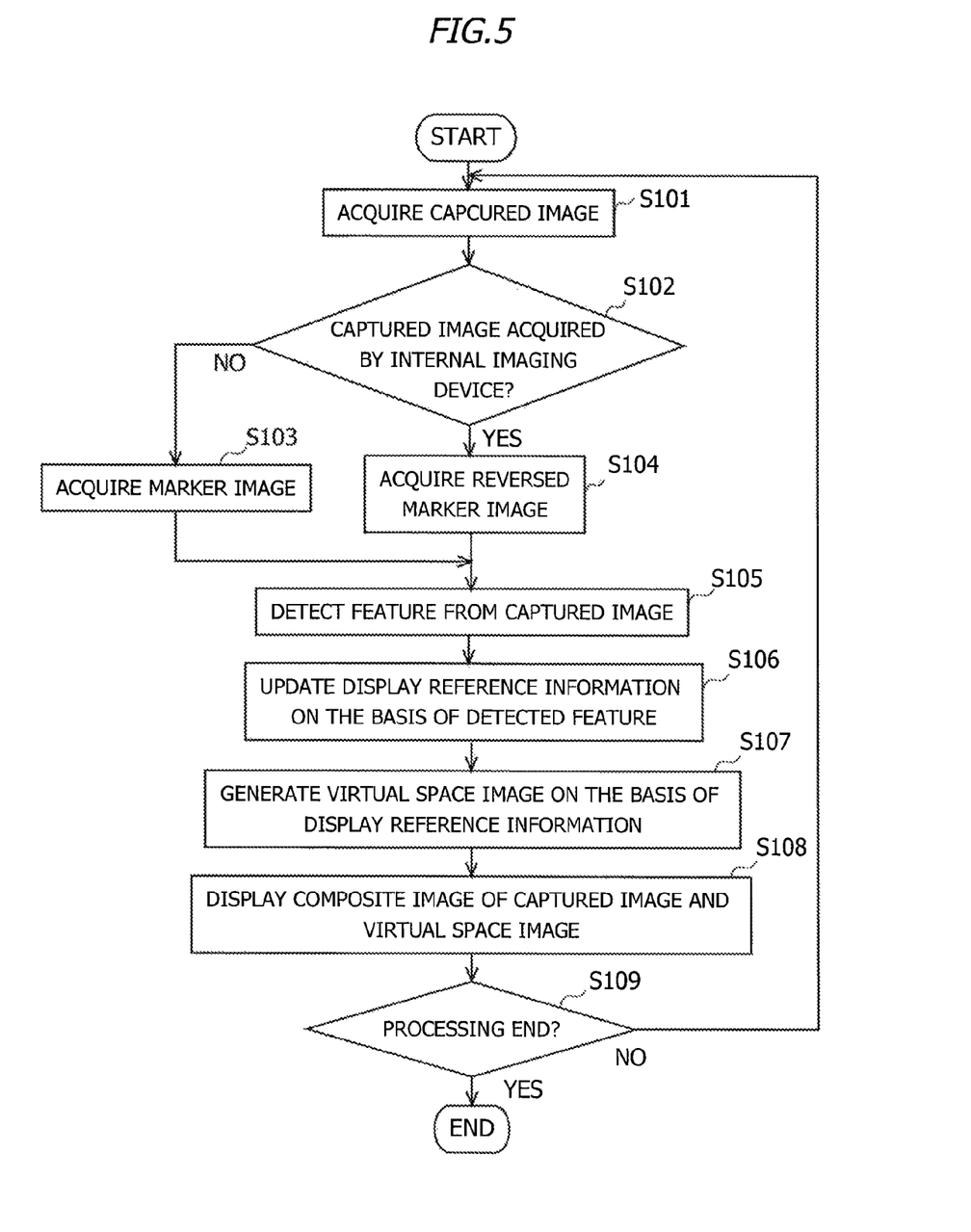
FIG. 5 shows an example non-limiting flow chart illustrating a flow of image processing according to an embodiment.

FIG. 5 is a flow chart illustrating a flow of image processing according to the present embodiment. The image processing illustrated in this flow chart is started upon reception of a user operation for activating an imaging function using the imaging device 15, in the information processing apparatus 1. The information stored by the display reference information storing unit 24 is initialized at the time of the activation of the imaging function, and the display reference information storing unit 24 stores therein no display reference information at the time of the activation of the imaging function. Note that the processing according to the present embodiment is repetitively executed for each of frames divided at 60 frames/second.

In Step S101 and Step S102, the captured image is acquired, and the imaging device used for the acquisition of the captured image is determined. The captured image acquiring unit 21 acquires the image captured by the imaging device 15 (Step S101). Then, the feature detecting unit 22 determines whether or not the imaging device used for the acquisition of the captured image acquired in Step S101 is the internal imaging device 15B (Step S102). The feature detecting unit 22 can determine whether or not the imaging device used for the acquisition of the captured image is the internal imaging device 15B through, for example: a method of referencing information indicating which of the external imaging device 15A and the internal imaging device 15B is currently activated, the information being recorded in the RAM 12 of the information processing apparatus 1; a method of referencing meta information indicating the imaging device, the meta information being put onto the acquired captured image; and the like. If it is determined that the imaging device used for the acquisition of the captured image is not the internal imaging device 15B (that is, the imaging device used for the acquisition of the captured image is the external imaging device 15A), the processing proceeds to Step S103. On the other hand, if it is determined that the imaging device used for the acquisition of the captured image is the internal imaging device 15B, the processing proceeds to Step S104.

In Step S103, the marker image is acquired. The feature detecting unit 22 acquires the marker image for comparison, from the marker information held by the auxiliary storage device 14. After that, the processing proceeds to Step S105.

In Step S104, the reversed marker image is acquired. The feature detecting unit 22 acquires the reversed marker image for comparison, from the marker information held by the auxiliary storage device 14. After that, the processing proceeds to Step S105.

In Step S105, the marker 3 is detected from the captured image. Upon the acquisition of the captured image, the feature detecting unit 22 detects, from the captured image, every marker 3 corresponding to the marker image acquired in Step S103 or the reversed marker image acquired in Step S104, as a feature in the captured space. The marker 3 can be detected using a general image recognition engine. After that, the processing proceeds to Step S106.

In Step S106, the reference acquisition process is executed for each marker 3. The display reference information updating unit 23 acquires, for each marker 3, the position posture information of the marker 3 in the real space on the basis of the detected marker 3, and updates the display reference information of each marker 3. More specifically, the display reference information updating unit 23 acquires the position and posture of the marker 3 in the real space, on the basis of: the position of the marker 3 in the captured image; a result of comparison between the marker size contained in the marker information and the size of the marker 3 included in the captured image; and distortion of the marker 3 in the captured image with reference to the marker image or the reversed marker image. The display reference information updating unit 23 updates the display reference information with the use of the thus acquired position posture information of the marker 3 in the real space. After that, the processing proceeds to Step S107.

In Step S107, the image of the virtual space is generated. The image generating unit 25 renders the image of the virtual space from the point of view of the virtual camera that is placed at the same position as that of the imaging device 15 in the marker coordinate system, the image of the virtual space including one or more virtual objects that are placed in the marker coordinate system after at least any of the position and posture thereof is determined in accordance with the display reference information. The data on each virtual object for rendering the virtual object is acquired from the virtual object information. Note that the virtual objects may be changed for each frame or few frames, for animation. In the animation, for example, the facial expression of a character as the virtual object can be changed, and the character can be moved. After that, the processing proceeds to Step S108.

In Step S108, a display process is executed. The display controlling unit 26 generates the composite image in which the image of the virtual space is superimposed on the captured image, and outputs and displays the composite image onto the display 16. After that, the processing proceeds to Step S109.

In Step S109, it is determined whether or not the image processing is ended. As described above, the processing illustrated in this flow chart is executed for each frame. Hence, the processing illustrated in this flow chart is repetitively executed from Step S101 on a regular basis, until the imaging function is ended (Step S109) on the basis of a user operation or the like.

Figure 6:
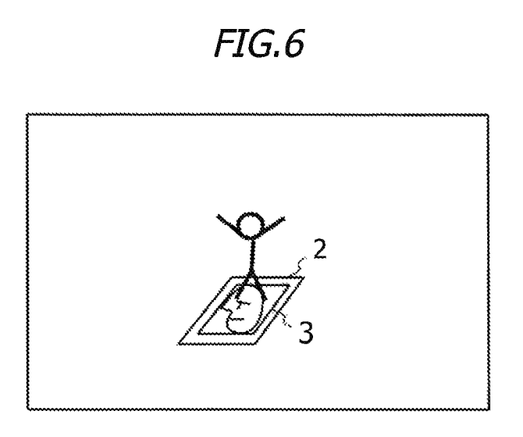
FIG. 6 shows an example non-limiting screen displayed when a captured image captured by an external imaging device is subjected to image processing, in an embodiment.
Figure 7:
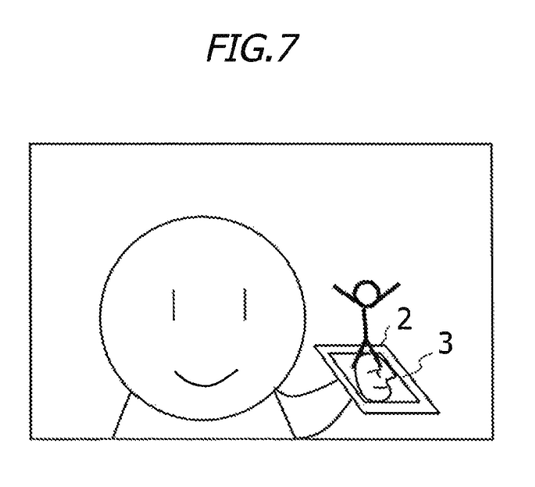
FIG. 7 shows an example non-limiting screen displayed when a reversed captured image captured by an internal imaging device is subjected to image processing, in an embodiment.

FIG. 6 and FIG. 7 are diagrams each illustrating an example of a display screen of the display 16 when the composite image is acquired by the image processing according to the present embodiment. More specifically, FIG. 6 is a diagram illustrating an example of a screen displayed when the image captured by the external imaging device 15A is subjected to the image processing, in the present embodiment, and FIG. 7 is a diagram illustrating an example of a screen displayed when the reversed image captured by the internal imaging device 15B is subjected to the image processing, in the present embodiment.

As described above, the information stored by the display reference information storing unit 24 is initialized at the time of the activation of the imaging function, and the display reference information storing unit 24 stores therein no display reference information at the time of the activation of the imaging function. Hence, immediately after the imaging function of the information processing apparatus 1 is activated in response to a user operation, in the case where the captured image does not include any marker, no virtual object is placed in the virtual space, and only the image captured by the imaging device 15 is displayed on the display 16.

If the marker 3 appears in the imaging range of the imaging device 15 and the captured image thus includes the marker 3, the display reference information updating unit 23 updates the display reference information on the basis of the marker 3 detected by the feature detecting unit 22, and the image generating unit 25 renders the virtual object on the basis of the position and posture corresponding to the marker 3. Hence, the composite image in which the virtual object is superimposed on the marker 3 is displayed on the display 16 (see FIG. 6 or FIG. 7).

Here, in the case where the captured image is an image captured by the external imaging device 15A, the captured image is used as it is captured, and the image of the virtual space is superimposed thereon (see FIG. 6). On the other hand, in the case where the captured image is an image captured by the internal imaging device 15B, the captured image is left-right reversed, and the image of the virtual space is superimposed thereon (see FIG. 7).

According to the above-mentioned embodiment, the marker 3 in a captured image can be correctly detected even in the case where the image is captured by the imaging device 15B in an imaging direction that is substantially the same as the display direction of the display 16, and the captured image is displayed left-right reversed in order to prevent the user who expects display similar to that of a mirror from having a feeling of strangeness.

According to the present disclosure, it is possible to improve the detection accuracy of a feature in the captured image even in the case where the captured image is reversed.

<Variations of Embodiment>

Hereinafter, variations applicable to the above-mentioned embodiment are described.

In the above-mentioned embodiment, in the case where the imaging device used for the acquisition of the captured image is the internal imaging device 15B, the feature detecting unit 22 acquires the reversed marker image for comparison, from the marker information held by the auxiliary storage device 14 (see Step S104 in FIG. 5). However, instead of such a process, the information processing apparatus 1 may further include a reversed image-for-detection generating unit (the illustration of which is omitted), and the reversed image-for-detection generating unit may reverse the marker image that is the image for detection held by the auxiliary storage device 14, to thereby generate the reversed marker image. In this case, the marker information may not contain the reversed marker image.

Further, in the above-mentioned embodiment, in the case where the captured image acquired by the captured image acquiring unit 21 is a reversed image, the feature detecting unit 22 compares the captured image with the reversed marker image, to thereby detect the marker 3. Alternatively, the feature detecting unit 22 may compare an image obtained by reversing the captured image with the marker image, to thereby detect the marker 3.

Further, in the case where the captured image acquired by the captured image acquiring unit 21 is a reversed image, the image generating unit 25 may generate an image of the virtual space including a reversed virtual object. In this way, the directions of the captured image and the image of the virtual space in the displayed image can be made coincident with each other, and a feeling of strangeness given to the user can be reduced.

Note that, in the above-mentioned embodiment, description is given of the case where the captured image is left-right reversed and where an image obtained by left-right reversing the marker image is used as the reversed marker image, but it is sufficient that the reverse direction of the captured image be coincident with the reverse direction of the reversed marker image, and the reverse direction is not limited to the left-right.

Further, the display 16 included in the information processing apparatus 1 may be a display device capable of glasses-free three-dimensional vision. For example, the display 16 may be a display device adopting a lenticular method or a parallax barrier method, in which an image for left eye and an image for right eye that are alternately displayed in a lateral direction can be separately recognized by the left eye and the right eye, respectively. Further, the display 16 may also be a display device capable of switching between a three-dimensional display mode in which a three-dimensional image is displayed and a two-dimensional display mode in which an image is two-dimensionally displayed (a two-dimensional image is displayed). Such switching between the display modes is made by, for example, a 3D control switch (the illustration of which is omitted).

In this case, in order to obtain a captured image for left eye and a captured image for right eye that enable three-dimensional vision, an imaging device capable of stereoscopic image capturing is used as the imaging device 15. Similarly, in order to enable the virtual space image to be three-dimensionally viewed, the image generating unit 25 generates a virtual image for left eye and a virtual image for right eye by means of two virtual cameras corresponding to the stereoscopic camera of the imaging device 15. Then, the display controlling unit generates a composite image for left eye and a composite image for right eye, and outputs the generated images to the display 16 capable of three-dimensional vision.

Further, in the above-mentioned embodiment, description is given of the example in which the marker coordinate system is used as the display reference information, but the display reference information may be information that is obtained from the real space and can be used as a reference of at least any of the position and posture of the virtual object in the virtual space. For example, the display reference information may be the captured image itself. In the case where the captured image is used as the display reference information, the image generating unit 25 extracts the display reference of the virtual object from the captured image stored as the display reference information for each frame.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable recording medium recording a program for image processing causing a computer to provide functionality comprising:
   a captured image acquisition that acquires a captured image captured by an imaging device;
   a display control that displays an image including the captured image on a display device; and
   a feature detection that detects, from the captured image, a feature in a real space captured in the captured image, using an image for detection of the feature,
   wherein when the captured image acquired by the captured image acquisition is a reversed image, the feature detection includes performance of a reverse comparison process to detect the feature, the reverse comparison process involving: comparing the captured image with a reversed image of the image for detection; or comparing an image obtained by further reversing the captured image, with the image for detection.

2. The non-transitory computer-readable recording medium recording the program for image processing according to claim 1, wherein
   when an image capturing direction of the imaging device is substantially the same as a display direction of the display device, the feature detection includes a determination that the captured image is a reversed image, and performance of the reverse comparison process to detect the feature.

3. The non-transitory computer-readable recording medium recording the program for image processing according to claim 2, wherein
   when the image capturing direction of the image capturing device is substantially opposite to the display direction of the display device, the feature detection includes a determination that the captured image is not a reversed image, and comparison of the captured image with the image for detection to detect the feature.

4. The non-transitory computer-readable recording medium recording the program for image processing according to claim 1, wherein
   when the imaging device used for the acquisition of the captured image is an imaging device set on a display surface side of the display device, the feature detection includes a determination that the captured image is a reversed image, and performs the reverse comparison process to detect the feature.

5. The non-transitory computer-readable recording medium recording the program for image processing according to claim 4, wherein
   when the imaging device used for the acquisition of the captured image is an imaging device set on an opposite side to a display surface of the display device, the feature detection includes a determination that the captured image is not a reversed image, and compares the captured image with the image for detection to detect the feature.

6. The non-transitory computer-readable recording medium recording the program for image processing according to claim 1, the program for image processing further causing the computer to provide further functionality comprising:
   a holder that holds the image for detection; and
   a reversed image-for-detection generation that reverses the image for detection held by the holder, to generate the reversed image of the image for detection.

7. The non-transitory computer-readable recording medium recording the program for image processing according to claim 1, the program for image processing further causing the computer to provide further functionality comprising:
   a reference information acquisition that acquires display reference information used as a reference of at least any of a position and a posture in a virtual space, of a virtual object placed in the virtual space, based on the feature; and
   an image generation that generates an image of the virtual space including the virtual object placed in accordance with the display reference information, wherein the display control includes display of, on the display device, a composite image in which the image of the virtual space is superimposed on the captured image.

8. The non-transitory computer-readable recording medium recording the program for image processing according to claim 7, wherein
when the captured image acquired by the captured image acquisition is a reversed image, the image generation includes generation of an image of the virtual space including a reversed image of the virtual object.

9. The non-transitory computer-readable recording medium recording the program for image processing according to claim 1, wherein
the captured image acquisition includes acquisition of an image reversed by the imaging device, to acquire a reversed image of the captured image.

10. The non-transitory computer-readable recording medium recording the program for image processing according to claim 1, wherein
the captured image acquisition includes of acquisition of the captured image that is outputted from the imaging device and is then subjected to a reverse process by means of software processing, to acquire a reversed image of the captured image.

11. An information processing apparatus comprising a computer processor, the information processing apparatus being at least configured to:
acquire a captured image captured by an imaging device;
display an image including the captured image on a display device;
detect, from the captured image, a feature in a real space captured in the captured image, using an image for detection of the feature; and
when the acquired captured image is a reversed image, perform a reverse comparison process to detect the feature, the reverse comparison process involving: comparing the captured image with a reversed image of the image for detection; or comparing an image obtained by further reversing the captured image, with the image for detection.

12. The information processing apparatus according to claim 11, wherein the information processing apparatus is further configured to:
when an image capturing direction of the imaging device is substantially the same as a display direction of the display device, determine that the captured image is a reversed image, and perform the reverse comparison process to detect the feature.

13. The information processing apparatus according to claim 11, wherein the information processing apparatus is further configured to:
when the imaging device used for the acquisition of the captured image is an imaging device set on a display surface side of the display device, determine that the captured image is a reversed image, and perform the reverse comparison process to detect the feature.

14. The information processing apparatus according to claim 11, wherein the information processing apparatus is further configured to:
hold the image for detection; and
reverse the held image for detection to generate the reversed image of the image for detection.

15. The information processing apparatus according to claim 11, wherein the information processing apparatus is further configured to:
acquire display reference information used as a reference of at least any of a position and a posture in a virtual space, of a virtual object placed in the virtual space, based on the feature; and
generate an image of the virtual space including the virtual object placed in accordance with the display reference information, wherein
display, on the display device, a composite image in which the image of the virtual space is superimposed on the captured image.

16. The information processing apparatus according to claim 11, wherein the information processing apparatus is further configured to acquire an image reversed by the imaging device to acquire a reversed image of the captured image.

17. The information processing apparatus according to claim 11, wherein the information processing apparatus is further configured to acquire the captured image that is outputted from the imaging device and is then subjected to a reverse process via software processing, to acquire a reversed image of the captured image.

18. An information processing system comprising:
a component onto which a feature captured by an imaging device is put; and
an information processing apparatus connected to the imaging device, wherein
the information processing apparatus includes a processor and is configured at least to:
acquire an captured image captured by the imaging device;
display an image including the captured image on a display device; and
detect, from the captured image, the feature captured in the captured image, using an image for detection of the feature, and
when the captured image that has been acquired is a reversed image, perform a reverse comparison process to detect the feature, the reverse comparison process involving: comparing the captured image with a reversed image of the image for detection; or comparing an image obtained by further reversing the captured image, with the image for detection.

19. An image processing method comprising:
acquiring, by a computer, an image captured by an imaging device;
displaying, by the computer, an image including the captured image on a display device; and
detecting, by the computer, from the captured image, a feature in a real space captured in the captured image, using an image for detection of the feature, wherein
in a case where the acquired captured image is a reversed image, the feature is detected by performing a reverse comparison process involving: comparing the captured image with a reversed image of the image for detection; or comparing an image obtained by further reversing the captured image, with the image for detection.

* * * * *